Jan. 5, 1954

J. W. WABER 2,664,936

INNER TUBE FOR PNEUMATIC TIRES

Filed July 2, 1949

INVENTOR:
JAMES W. WABER
BY C. P. Soper
ATTORNEY

Patented Jan. 5, 1954

2,664,936

UNITED STATES PATENT OFFICE 2,664,936

INNER TUBE FOR PNEUMATIC TIRES

James W. Waber, Chicago, Ill.

Application July 2, 1949, Serial No. 102,771

2 Claims. (Cl. 152—347)

This invention relates to a new and useful improvement in inner tubes for pneumatic tires such as are used on the wheels of motor vehicles and particularly to inner tubes commonly referred to as puncture-proof tubes but more accurately as self-sealing tubes. The present device is particularly an improvement on the type of structure disclosed in applicant's patents, Nos. 1,808,091 and 2,033,962.

The object of this invention is to provide a self-sealing tube, the self-sealing operation of which is entirely dependable and a tube which will not be unduly heavy or costly to manufacture.

A feature of the invention is the provision at the tread area, of an ordinary puncture-sealing tube of an additional layer of sealing compound and a cover layer of vulcanizable material thereover. These additional layers are not for the purpose of sealing a puncture but particularly to seal off the slow leaks which often persist in all puncture-sealing tubes of all constructions.

Another feature of the invention is the manner of preventing permanent displacement of the sealant which often results from the centrifugal and other forces to which it is subjected due to the high speed of modern vehicles.

Figure 1:
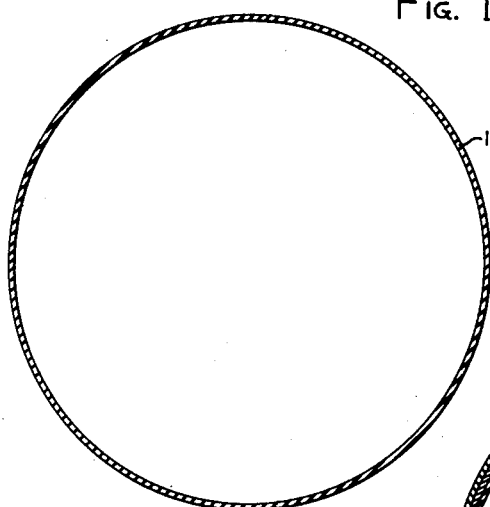
Figure 2:
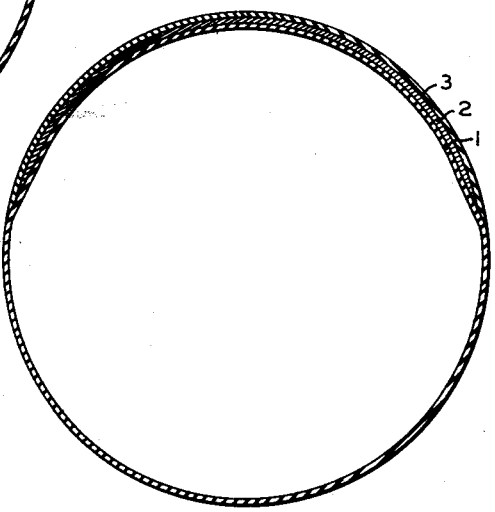
Figure 3:
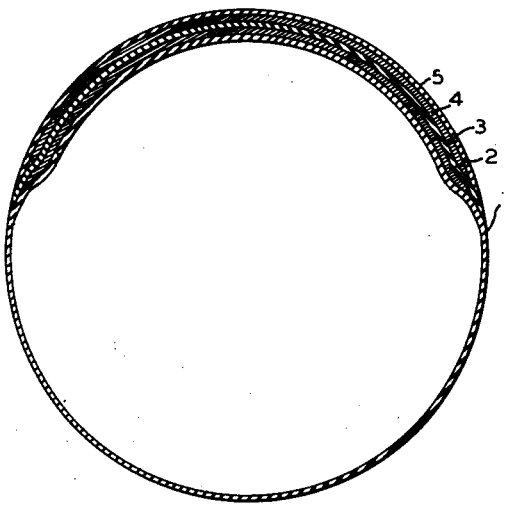

It is believed the further disclosure of this invention will be most readily understood by reference to the accompanying drawings in which Fig. 1 illustrates a cross section of the basic layer of the tube herein disclosed;

Fig. 2 shows a crescent-shaped layer of mastic sealant applied over the tread portion of the basic tube of Fig 1 and a vulcanizable layer of rubber or like material applied over the layer of sealant material, and Fig. 3 discloses a second layer of mastic or sealant material applied at the tread of the tube and an outer layer of vulcanizable material over the second layer of sealant.

The structure shown in Fig. 2, if properly vulcanized would result in a tube similar to that disclosed in applicant's Patent No. 1,808,091. The invention of this application resides in applying layers 4 and 5 (Fig. 3) to the structure of Fig. 2 or to the tread portion of other puncture-sealing tubes.

Referring now to the drawings in which like reference characters indicate like parts in the several views: at 1 is shown the basic layer of the tube which may be similar to the ordinary well-known single-ply tube before vulcanization. Over the tread portion of layer 1 is placed a crescent-shaped layer of unvulcanizable plastic material 2 and layer 2, in turn, is covered by a layer 3 of vulcanizable rubber or similar material. The edges of layer 3 extend beyond the edges of layer 2 for contact with and vulcanization to the base layer 1 of the tube. The structure thus far described is shown in Fig. 2 of the drawings.

On the tread portion of the structure of Fig. 2 is placed a second crescent-shaped layer 4 of mastic sealing material 4 and over layer 4 is placed a layer 5 of vulcanizable material such as rubber or the like. Layer 5 extends beyond the lateral margin of layer 4 for contact with and vulcanization to layer 3 or basic layer 1. The mastic or sealing material employed in layers 2 and 4 may be such as is contemplated in applicant's patents, Nos. 1,808,091 and 2,033,962. Puncture-sealing compounds of this type are well-known in the art but in the present structure a sealant consisting of:

100 pounds rubber
40 pounds rosin oil with boiling point near 400° F.
2 pounds rosin, and
10 pounds wood flour has been found to be very satisfactory.

Layers 2, 3, 4, and 5 may be applied to the basic layer 1 in a manner as explained in applicant's patents, Nos. 1,808,091 and 2,033,962. After layers 1 to 5 are assembled the tube is placed in a mold and vulcanized in a manner similar to that described in said patents.

While building the tube and before vulcanizing, a vulcanization accelerator should be applied to those portions of layers 1 and 3 which underlie the tread portion of the tube and are thus separated a substantial distance from the mold by the intervening layers. This is to insure that all parts of layers 1 and 3 will receive the necessary substantially complete or tight cure or tight vulcanization upon vulcanization of the tube.

The use of molded compression type tubes is now greater than at any time in the history of inner tubes but only as slow-leak tubes to aid in decreasing the rate of the escape of the air from the punctured tube so as to permit a vehicle to be rushed to some nearby service station before air loss makes a change on the road absolutely necessary.

All puncture-sealing tubes, no matter what method of construction is used, are frequently subject to some air losses, or slow leaks, when subjected to the puncture-sealing tests specified by the Bureau of Standards and this tendency increases with the age of the tube.

To prevent these losses has posed a serious problem that no manufacturer of puncture-sealing tubes has been able to solve in all of thirty years or more, in which puncture-sealing tubes employing a plastic sealing compound have been made in some form and no one heretofore has made the tubes effectively puncture-sealing for the normal life of the tube.

Tubes have been made by the method of construction herein disclosed and many of them submitted to laboratory tests, as well as to road tests, and it has been found that this tube does meet the Bureau of Standards specifications.

By making the tube with five plies under the tread, that portion of the tube becomes considerably thicker than the rest of the tube. Tubes must be cured in a very short time for production reasons. By applying the methods of building taught in my Patent No. 2,033,962, modified by adjusting the amount of accelerator applied to the middle layer of vulcanizable material as well as to that portion of the basic tube lying under the plastic, so that low temperature vulcanization will continue, the tube may be removed from the mold as soon as the thin unprotected portion of the tube is sufficiently vulcanized to be ready for removal as the curing will continue in the thick portion of the tube due to the latent heat therein until the temperature in this mass drops below the vulcanization range of that portion of the tube affected by the accelerator. This time is always long enough to give the proper degree of cure to all parts of the tube.

By making the layers 2, 3, 4, and 5 slightly thinner than in puncture-sealing tubes of this character previously manufactured, the overall thickness and weight of the tread portion of the tube is not appreciably increased but the puncture-sealing qualities of the tube are greatly improved. As shown in Fig. 3, the layers 3 and 5 are of substantially the same thickness. Thus, a very superior tube is provided at only the slight increase in cost arising from the additional labor required to apply the layers 4 and 5 and with no material increase in weight.

The expedient herein disclosed may be applied to various self-sealing tubes, especially such as employ an unvulcanizable tacky mastic for sealing purposes, as well as to the character of tube disclosed by applicant's Patent No. 1,808,091.

Many modifications may be made in the details herein disclosed without departing from the spirit of the invention. The invention, therefore, should be limited only by the scope of the appended claims.

Having thus described my invention, what I claim is new and desire to secure by Letters Patent of the United States is:

1. An inner tube for pneumatic tires comprising an endless tightly vulcanized tube member having a tread zone, an annular layer of unvulcanizable easily displaceable plastic composition superimposed on said tread zone, a member providing a layer of tightly vulcanized material superimposed on said plastic layer and vulcanized to said tube, an annular layer of unvulcanizable easily displaceable plastic composition superimposed on said vulcanized layer, and a layer of tightly vulcanized material of substantially the same thickness and characteristics as the first said layer of tightly vulcanized material superimposed on the second said plastic layer and vulcanized to one of said members, each of said layers being uninterrupted and extending both transversely and circumferentially throughout said tread zone.

2. An inner tube for pneumatic tires comprising an endless tightly vulcanized tube member having a tread zone, an annular layer of unvulcanizable easily displaceable plastic composition superimposed on and contiguous to said tread zone, a member consisting of a layer of tightly vulcanized material superimposed on and extending beyond said plastic layer and vulcanized to said tube, an annular layer of unvulcanizable easily displaceable plastic composition superimposed on said vulcanized layer, and a layer of tightly vulcanized material of substantially the same thickness and characteristics as the first said layer of tightly vulcanized material superimposed on and extending beyond the second said plastic layer and vulcanized to one of said vulcanized members, each of said layers being uninterrupted and extending both transversely and circumferentially throughout said tread zone.

JAMES W. WABER.

References Cited in the file of this patent

UNITED STATES PATENTS

| Number | Name | Date |
|---|---|---|
| 496,527 | Morris | May 2, 1893 |
| 585,661 | Dunn | July 6, 1897 |
| 1,217,888 | Wildman et al. | Feb. 27, 1917 |
| 1,455,775 | Berryman | May 22, 1923 |
| 1,480,252 | Fetter | Jan. 8, 1924 |
| 1,565,813 | Ostberg | Dec. 15, 1925 |
| 1,689,907 | Allen | Oct. 30, 1928 |
| 1,808,091 | Waber | June 2, 1931 |
| 1,835,415 | Martin | Dec. 8, 1931 |
| 1,903,355 | Berger | Apr. 4, 1933 |
| 2,033,962 | Waber | Mar. 17, 1936 |
| 2,161,490 | Waber | June 6, 1939 |
| 2,264,021 | Eger | Nov. 25, 1941 |
| 2,332,913 | Iknayan | Oct. 26, 1943 |
| 2,493,047 | Waber | Jan. 3, 1950 |
| 2,537,107 | Waber | Jan. 9, 1951 |

FOREIGN PATENTS

| Number | Country | Date |
|---|---|---|
| 257,463 | Italy | Mar. 3, 1928 |

(Corresponding Great Britain Pat. No. 284,880, Feb. 9, 1928)